(12) United States Patent
Gonze et al.

(10) Patent No.: US 8,475,574 B2
(45) Date of Patent: Jul. 2, 2013

(54) ELECTRIC HEATER AND CONTROL SYSTEM AND METHOD FOR ELECTRICALLY HEATED PARTICULATE FILTERS

(75) Inventors: Eugene V. Gonze, Pinckney, MI (US); Michael J. Paratore, Jr., Howell, MI (US); Garima Bhatia, Bangalore (IN)

(73) Assignee: GM Global Technology Operations LLC

( * ) Notice: Subject to any disclaimer, the term of this patent is extended or adjusted under 35 U.S.C. 154(b) by 259 days.

(21) Appl. No.: 12/536,089

(22) Filed: Aug. 5, 2009

(65) Prior Publication Data

US 2011/0030554 A1    Feb. 10, 2011

(51) Int. Cl.
*B01D 53/00*    (2006.01)
*B01D 50/00*    (2006.01)
*B01D 24/00*    (2006.01)
*B01D 39/14*    (2006.01)
*B01D 39/06*    (2006.01)

(52) U.S. Cl.
USPC ............. 95/283; 55/522; 55/523; 55/524; 55/282.3; 422/169; 422/170; 422/171; 422/172; 422/177; 422/178; 422/179; 422/180; 422/181; 422/182

(58) Field of Classification Search
USPC ........... 55/522–524, 282.3; 422/169–172, 422/177–182; 95/283
See application file for complete search history.

(56) References Cited

U.S. PATENT DOCUMENTS

| 4,404,795 | A |   | 9/1983 | Oishi et al. |
|---|---|---|---|---|
| 4,404,796 | A |   | 9/1983 | Wade |
| 4,427,418 | A |   | 1/1984 | Kogiso et al. |
| 4,516,993 | A | * | 5/1985 | Takeuchi et al. ............... 55/283 |
| 4,549,395 | A |   | 10/1985 | Dammann |
| 4,549,398 | A |   | 10/1985 | Oishi et al. |
| 4,685,290 | A |   | 8/1987 | Kamiya et al. |
| 5,144,798 | A | * | 9/1992 | Kojima et al. .................. 60/303 |
| 5,171,335 | A | * | 12/1992 | Kojima et al. .................. 55/523 |
| 5,195,316 | A |   | 3/1993 | Shinzawa et al. |
| 5,207,807 | A | * | 5/1993 | Manfre et al. ............... 55/282.1 |
| 5,458,673 | A |   | 10/1995 | Kojima et al. |
| 5,472,462 | A | * | 12/1995 | Pischinger et al. ............ 55/282 |
| 5,616,835 | A |   | 4/1997 | Schnaibel et al. |
| 5,711,149 | A |   | 1/1998 | Araki |
| 5,716,586 | A |   | 2/1998 | Taniguchi |

(Continued)

FOREIGN PATENT DOCUMENTS

| CN | 1535351 | 10/2004 |
|---|---|---|
| CN | 1540143 | 10/2004 |

(Continued)

*Primary Examiner* — Amber Orlando

(57) ABSTRACT

An exhaust treatment system comprises a particulate matter filter, a first heater element, and a second heater element. The particulate matter (PM) filter filters PM from exhaust gas and includes N zones. Each of the N zones includes an inlet area that receives a portion of the exhaust gas. N is an integer greater than one. The first heater element includes a contact area that heats exhaust gas input to an inlet area of a first one of the N zones. The second heater element includes a second contact area that heats exhaust gas input to an inlet area of a second one of the N zones. A ratio of the contact area of the first heater element to the inlet area of the first zone is greater than a ratio of the contact area of the second heater element to the inlet area of the second zone.

20 Claims, 8 Drawing Sheets

U.S. PATENT DOCUMENTS

| | | |
|---|---|---|
| 5,839,279 A | 11/1998 | Moriya et al. |
| 6,013,118 A | 1/2000 | Matsunuma et al. |
| 6,050,086 A | 4/2000 | Ishizuka et al. |
| 6,090,172 A * | 7/2000 | Dementhon et al. .......... 55/282.3 |
| 6,167,696 B1 | 1/2001 | Maaseidvaag et al. |
| 6,176,896 B1 | 1/2001 | Dementhon et al. |
| 6,405,528 B1 | 6/2002 | Christen et al. |
| 6,634,170 B2 | 10/2003 | Hiranuma et al. |
| 6,769,246 B2 | 8/2004 | Strohmaier et al. |
| 6,781,098 B2 | 8/2004 | Toyoda |
| 6,973,778 B2 | 12/2005 | Kondou et al. |
| 7,062,904 B1 | 6/2006 | Hu et al. |
| 7,073,326 B2 | 7/2006 | Cheong |
| 7,111,455 B2 | 9/2006 | Okugawa et al. |
| 7,146,804 B2 | 12/2006 | Yahata et al. |
| 7,171,801 B2 | 2/2007 | Verkiel et al. |
| 7,288,137 B2 | 10/2007 | Iyer et al. |
| 7,340,887 B2 | 3/2008 | Ante et al. |
| 7,412,822 B2 | 8/2008 | Zhan et al. |
| 7,607,295 B2 | 10/2009 | Yokoyama et al. |
| 7,615,725 B2 | 11/2009 | Kosaka et al. |
| 7,631,493 B2 | 12/2009 | Shirakawa et al. |
| 7,685,811 B2 | 3/2010 | Taylor et al. |
| 7,794,528 B2 | 9/2010 | Tochikawa et al. |
| 7,886,529 B2 | 2/2011 | Gonze et al. |
| 7,896,956 B2 | 3/2011 | Takase et al. |
| 7,901,475 B2 * | 3/2011 | Gonze et al. ................. 55/282.3 |
| 8,037,673 B2 | 10/2011 | Gonze et al. |
| 8,146,350 B2 | 4/2012 | Bhatia et al. |
| 8,292,987 B2 | 10/2012 | Gonze et al. |
| 2003/0000188 A1 | 1/2003 | Harada et al. |
| 2003/0113249 A1 | 6/2003 | Hepburn et al. |
| 2003/0131592 A1 | 7/2003 | Saito et al. |
| 2004/0134187 A1 | 7/2004 | Inoue et al. |
| 2004/0194450 A1 | 10/2004 | Tanaka et al. |
| 2005/0072141 A1 | 4/2005 | Kitahara |
| 2005/0198944 A1 | 9/2005 | Saitoh et al. |
| 2006/0075731 A1 | 4/2006 | Ohno et al. |
| 2006/0254265 A1 | 11/2006 | Odajima et al. |
| 2007/0062181 A1 | 3/2007 | Williamson et al. |
| 2007/0137186 A1 | 6/2007 | Igarashi |
| 2007/0214778 A1 | 9/2007 | Narita et al. |
| 2007/0220869 A1 * | 9/2007 | Gonze et al. ..................... 60/297 |
| 2007/0220870 A1 * | 9/2007 | Gonze et al. ..................... 60/297 |
| 2007/0227104 A1 * | 10/2007 | Gonze et al. ................. 55/282.3 |
| 2007/0245721 A1 | 10/2007 | Colignon |
| 2008/0041035 A1 | 2/2008 | Sawada et al. |
| 2008/0083212 A1 | 4/2008 | Ament et al. |
| 2008/0295483 A1 | 12/2008 | Scaife et al. |
| 2009/0064664 A1 | 3/2009 | Hirata et al. |
| 2009/0071128 A1 | 3/2009 | Gonze et al. |
| 2009/0113883 A1 | 5/2009 | Bhatia et al. |
| 2009/0158715 A1 | 6/2009 | Stroh et al. |
| 2009/0183501 A1 | 7/2009 | Gonze et al. |
| 2009/0288398 A1 | 11/2009 | Perfetto et al. |
| 2010/0095657 A1 * | 4/2010 | Gonze et al. ..................... 60/295 |
| 2010/0126145 A1 | 5/2010 | He et al. |

FOREIGN PATENT DOCUMENTS

| | | |
|---|---|---|
| CN | 101091038 A | 12/2007 |
| CN | 101429884 A | 5/2009 |
| DE | 102008046706 | 4/2009 |
| DE | 102008046924 | 4/2009 |
| DE | 102008050169 | 5/2009 |
| GB | 2454341 A | 6/2009 |
| JP | 06-221138 | 8/1994 |
| JP | 2000-297625 | 10/2000 |

* cited by examiner

ELECTRIC HEATER AND CONTROL SYSTEM AND METHOD FOR ELECTRICALLY HEATED PARTICULATE FILTERS

FIELD

The present disclosure relates to engine control systems and methods, and more particularly to electric heaters and control systems and methods for electrically heated particulate filters.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Compression ignition engines, such as diesel engines, may produce particulate matter (PM) that is filtered from exhaust gas and collected by a PM filter. Over time, the PM filter becomes full of PM that may impede flow of the exhaust gas. A regeneration process may be used to "clean" the PM filter. For example, the PM may be burned within the PM filter using electrical heating.

During the electrical heating, an electric heater heats exhaust gas flowing into the PM filter. The electric heater may include a plurality of heater elements corresponding to a plurality of zones of the PM filter. When activated, a heater element heats a portion of the exhaust gas input to a corresponding zone causing PM therein to combust. The PM continues to combust through channels of the PM filter. This process continues for each of the plurality of zones until each zone is regenerated.

SUMMARY

An exhaust treatment system comprises a particulate matter filter, a first heater element, and a second heater element. The particulate matter (PM) filter filters PM from exhaust gas and includes N zones. Each of the N zones includes an inlet area that receives a portion of the exhaust gas. N is an integer greater than one. The first heater element includes a contact area that heats exhaust gas input to an inlet area of a first one of the N zones. The second heater element includes a second contact area that heats exhaust gas input to an inlet area of a second one of the N zones. A ratio of the contact area of the first heater element to the inlet area of the first zone is greater than a ratio of the contact area of the second heater element to the inlet area of the second zone.

In other features, the exhaust treatment system includes a third heater element that includes a contact area that heats exhaust gas input to an inlet area of a third one of the N zones. The ratio of the contact area of the second heater element to the inlet area of the second zone is greater than a ratio of the contact area of the third heater element to the inlet area of the third zone.

In still other features, the contact area of the first heater element is greater than the contact area of the second heater element. In other features, the inlet area of the second zone is greater than the inlet area of the first zone.

In still other features, each of the first and second heater elements is one of a coil heater, a grid heater, a foil heater, and a thick-film heater.

In still other features, the contact area of the first heater element includes a first depth extending in a direction that is parallel to a flow of the exhaust gas, and the contact area of the second heater element includes a second depth extending in a direction that is parallel to the flow direction of the exhaust gas. The first depth is greater than the second depth. In still other features, the contact area of the first heater element includes a first length, and the contact area of the second heater element includes a second length. The first length is greater than the second length.

A control system comprises the exhaust treatment system and a heater control module. The heater control module activates the first heater element until PM in the first one of the N zones combusts and activates the second heater element until PM in the second one of the N zones combusts.

In other features, the heater control module activates the second heater element after regeneration of the first one of the N zones completes. In still other features, the heater control module activates each of the first and second heater elements by applying a predetermined level of power.

A method of operating an exhaust treatment system comprises: (1) providing a particulate matter (PM) filter that filters PM from exhaust gas and that includes N zones. Each of the N zones includes an inlet area that receives a portion of the exhaust gas. N is an integer greater than one; (2) activating a first heater element that includes a contact area that heats exhaust gas input to an inlet area of a first one of the N zones until PM in the first zone combusts; and (3) activating a second heater element that includes a second contact area that heats exhaust gas input to an inlet area of a second one of the N zones until PM in the second zone combusts. A ratio of the contact area of the first heater element to the inlet area of the first zone is greater than a ratio of the contact area of the second heater element to the inlet area of the second zone.

In other features, the method further comprises activating a third heater element that includes a contact area that heats exhaust gas input to an inlet area of a third one of the N zones until PM in the third zone combusts. The ratio of the contact area of the second heater element to the inlet area of the second zone is greater than a ratio of the contact area of the third heater element to the inlet area of the third zone.

In still other features, the contact area of the first heater element is greater than the contact area of the second heater element. In still other features, the inlet area of the second zone is greater than the inlet area of the first zone.

In still other features, each of the first and second heater elements is one of a coil heater, a grid heater, a foil heater, and a thick-film heater.

In still other features, the contact area of the first heater element includes a first depth extending in a direction that is parallel to a flow of the exhaust gas, and the contact area of the second heater element includes a second depth extending in a direction that is parallel to the flow direction of the exhaust gas. The first depth is greater than the second depth. In still other features, the contact area of the first heater element includes a first length, and the contact area of the second heater element includes a second length. The first length is greater than the second length.

In still other features, the method further comprises activating the second heater element after regeneration of the first zone completes. In still other features, the method further comprises activating each of the first and second heater elements by applying a predetermined level of power.

In still other features, the method further comprises activating a plurality of heater elements that correspond to the N zones. Each heater element includes a ratio of a contact area of the heater element to an inlet area of a corresponding one of the N zones. The heater elements are activated one at a time in order from a heater element having the greatest ratio to a heater element having the smallest ratio.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
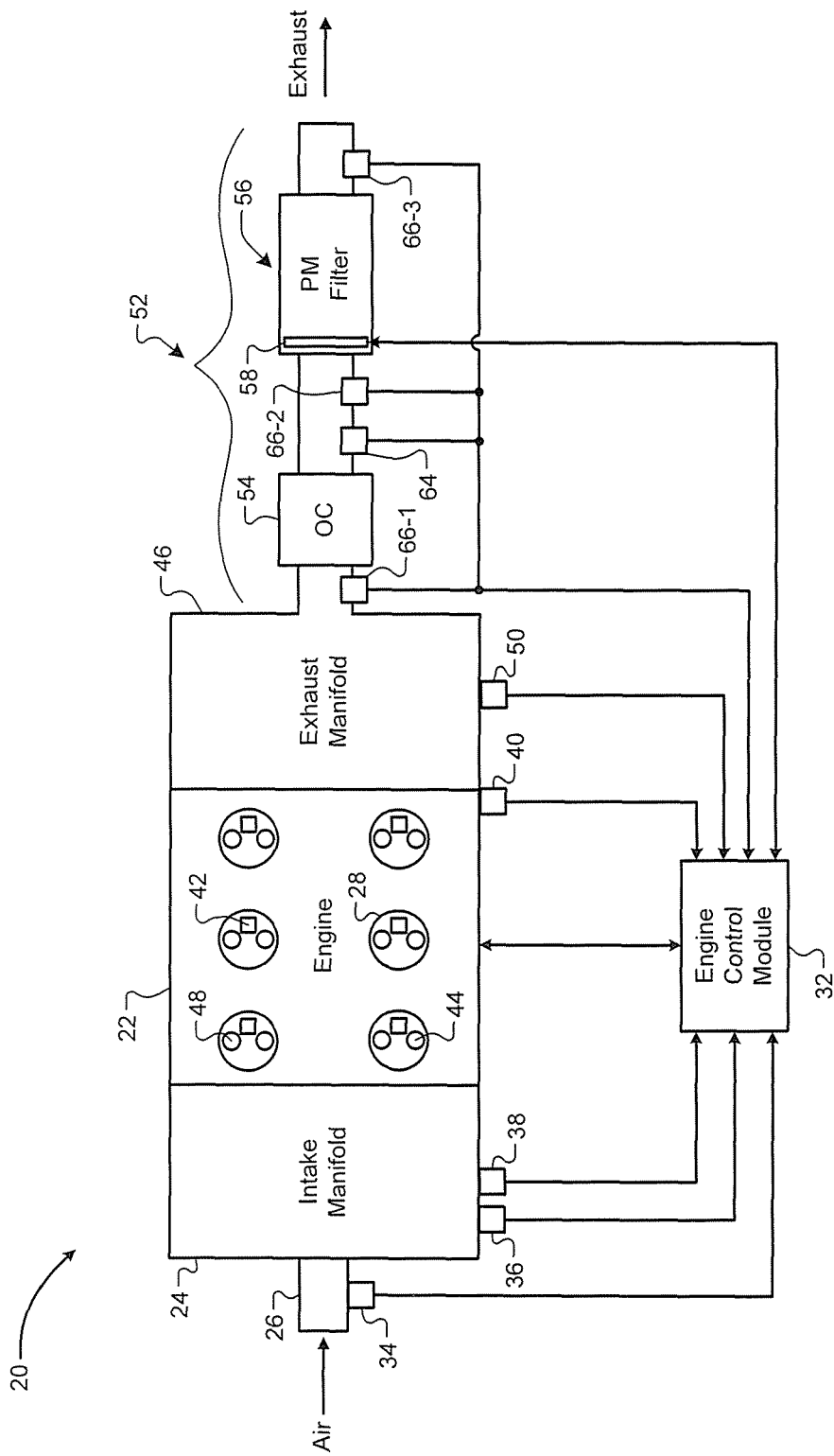
FIG. 1 is a functional block diagram of an exemplary engine system according to the principles of the present disclosure.

The following description is merely exemplary in nature and is in no way intended to limit the disclosure, its application, or uses. For purposes of clarity, the same reference numbers will be used in the drawings to identify similar heater elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Each of the heater elements includes a contact area that contacts a portion of the exhaust gas and that transfers heat to the portion of the exhaust gas. Each portion of the exhaust gas is input to a zone of the PM filter corresponding to each heater element. An inlet area of each zone depends on the configuration of the corresponding heater element. The amount of contact area of a heater element per inlet area of a corresponding zone may be referred to as a heater density of the heater element.

Typically, an electric heater has heater elements that include similar heater densities. When an exhaust flow rate is high, a typical heater element may not be able to transfer enough heat to initiate regeneration of a corresponding zone. The exhaust flow rate may be high when the engine operates at high speeds and high loads, such as during highway driving conditions. The typical heater element may not be able to transfer enough heat because a period during which the contact area and the portion of the exhaust gas are in contact may be too short. Additionally, the typical heater element may not be able to transfer enough heat because the contact area may not contact enough of the exhaust gas.

An electric heater of the present disclosure includes heater elements with different heater densities that transfer heat to the exhaust gas and regenerate the PM filter regardless of the exhaust flow rate. The heater elements may include different contact areas to vary the heater densities. For example only, the heater elements may include different geometries, such as lengths, widths, and depths of the heater element to vary the heater densities. The heater elements may be configured such that the corresponding zones include different inlet areas to vary the heater densities.

A first heater element may be configured with a heater density that transfers enough heat to regenerate a corresponding first zone when the exhaust flow rate is high. For example only, the heater density of the first heater element may be maximized by providing an increased contact area and/or a reduced inlet area. After the first zone regenerates, PM may no longer impede the exhaust gas flowing through the first regenerated zone. Thus, the exhaust flow rate through the first regenerated zone increases, and the exhaust flow rates through non-regenerated zones decreases. The decreased exhaust flow rate in the non-regenerated zones may increase the period during which the contact areas of the corresponding heater elements and the portions of the exhaust gas are in contact. Therefore, the remaining heater elements may be configured with heater densities that are less than the heater density of the first heater element.

Accordingly, the electric heater of the present disclosure includes a plurality of heater elements with different heater densities that decrease in magnitude in order of activation. A control system and method of the present disclosure activates the heater elements in decreasing order of magnitude from the greatest heater density to the lowest heater density to regenerate the PM filter at various exhaust flow rates.

Referring now to FIG. 1, an exemplary engine system 20 is schematically illustrated in accordance with the present disclosure. The engine system 20 is merely exemplary in nature. The electrically heated particulate filter described herein may be implemented in various engine systems using a particulate matter (PM) filter. Such engine systems may include, but are not limited to, diesel engine systems, gasoline direct injection engine systems, and homogeneous charge compression ignition engine systems.

The engine system 20 includes an engine 22 that combusts an air/fuel mixture to produce drive torque. Air is drawn into an intake manifold 24 through an inlet 26. A throttle (not shown) may be included to regulate air flow into the intake manifold 24. Air within the intake manifold 24 is distributed into cylinders 28. Although FIG. 1 depicts six cylinders 28, the engine 22 may include additional or fewer cylinders 28. For example, engines having 4, 5, 8, 10, 12, and 16 cylinders are contemplated.

The engine control module (ECM) 32 communicates with components of the engine system 20. The components may include the engine 22, sensors, and actuators as discussed herein. The ECM 32 may implement control of the electrically heated particulate filter of the present disclosure.

Air passes through the inlet 26 through a mass airflow (MAF) sensor 34. The MAF sensor 34 generates a MAF signal that indicates a rate of air flowing through the MAF sensor 34. A manifold pressure (MAP) sensor 36 is positioned in the intake manifold 24 between the inlet 26 and the engine 22. The MAP sensor 36 generates a MAP signal that indicates air pressure in the intake manifold 24. An intake air temperature (IAT) sensor 38 located in the intake manifold 24 generates an IAT signal based on intake air temperature.

An engine crankshaft (not shown) rotates at engine speed or a rate that is proportional to engine speed. A crankshaft sensor 40 senses a position of the crankshaft and generates a crankshaft position (CSP) signal. The CSP signal may be related to the rotational speed of the crankshaft and cylinder events. For example only, the crankshaft sensor 40 may be a variable reluctance sensor. The engine speed and cylinder events may be sensed using other suitable methods.

The ECM 32 actuates fuel injectors 42 to inject fuel into the cylinders 28. An intake valve 44 selectively opens and closes to enable air to enter the cylinder 28. An intake camshaft (not shown) regulates the intake valve position. A piston (not shown) compresses and combusts the air/fuel mixture within the cylinder 28. The piston drives the crankshaft during a power stroke to produce drive torque. Exhaust gas resulting from the combustion within the cylinder 28 is forced out through an exhaust manifold 46 when an exhaust valve 48 is in an open position. An exhaust camshaft (not shown) regulates the exhaust valve position. An exhaust manifold pressure (EMP) sensor 50 generates an EMP signal that indicates exhaust manifold pressure.

An exhaust system 52 may treat the exhaust gas. The exhaust system 52 may include an oxidation catalyst (OC) 54. The OC 54 oxidizes carbon monoxide and hydrocarbons in the exhaust gas. The OC 54 oxidizes the exhaust based on the post combustion air/fuel ratio. The amount of oxidation may increase the temperature of the exhaust.

The exhaust system 52 includes a particulate matter (PM) filter assembly 56. The PM filter assembly 56 may receive exhaust gas from the OC 54 and filter any particulate matter present in the exhaust. An electric heater 57 selectively heats the exhaust and/or a portion of the PM filter assembly 56 to initiate regeneration of the PM. The ECM 32 controls the engine 22 and filter regeneration based on various sensed and/or estimated information.

More specifically, the ECM 32 may estimate a PM filter load value based on the sensed and estimated information. The filter load value may correspond to an amount of particulate matter in the PM filter assembly 56. The filter load value may be based on an exhaust temperature and/or the exhaust flow. Exhaust flow may be based on the MAF signal and fueling of the engine 22. When the filter load value is greater than or equal to a filter load threshold, regeneration may be initiated by the ECM 32.

The exhaust system 52 may include a gas sensor 64 and exhaust temperature sensors 66-1, 66-2, 66-3 (collectively exhaust temperature sensors 66). The gas sensor 64 generates gas level signals that indicate amounts of NOx and/or oxygen in the exhaust gas.

The exhaust temperature sensors 66 generate exhaust temperature signals that indicate temperatures of the exhaust gas. The exhaust temperature sensors 66 may measure temperatures of the exhaust gas before the OC 54 and the PM filter assembly 56. The exhaust temperature sensors 66 may measure temperatures of the exhaust gas after the PM filter assembly 56 and/or between the OC 54 and the PM filter assembly 56.

For example only, exhaust temperature sensor 66-1 may measure an outlet gas temperature of the exhaust manifold 46 (i.e., an inlet exhaust gas temperature of the OC 54). Exhaust temperature sensor 66-2 may measure an outlet exhaust gas temperature of the OC 54 (i.e., an inlet gas temperature of the PM filter assembly 56). Exhaust temperature sensor 66-3 may measure an outlet gas temperature of the PM filter assembly 56. The ECM 32 may generate an exhaust temperature model to estimate exhaust temperatures throughout the exhaust system 52.

Figure 2:
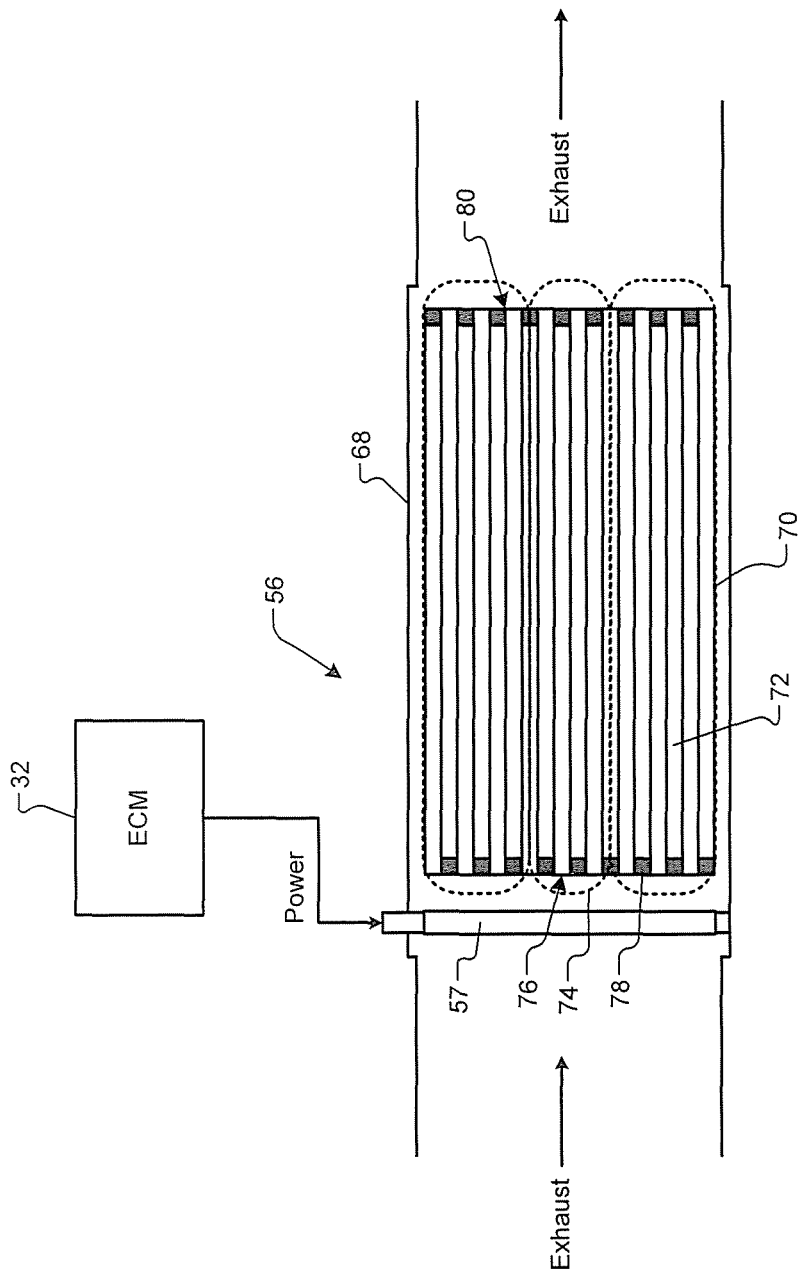
FIG. 2 is functional block diagram illustrating regeneration of an exemplary electrically heated particulate filter according to the principles of the present disclosure.

Referring now to FIG. 2, an exemplary PM filter assembly 56 may include a housing 68, a PM filter 70, and the electric heater 57. The electric heater 57 may be in contact with the PM filter 70 or spaced apart from the PM filter 70. The PM filter 70 includes channels 72 through which exhaust gas may flow. PM may be filtered as the exhaust gas passes through the channels 72, leaving PM inside the channels 72.

The ECM 32 may apply energy or power to the electric heater 57 in the form of voltage or current to heat exhaust gas input to zones 74 of the PM filter 70. The electric heater 57 may also directly heat portions of an inlet 76 to the PM filter 70. When the temperature of one of the zones 74 reaches a PM combustion temperature, PM collected in the channels 72 may ignite behind endplugs 78 and begin to combust. The combusting PM advances through the channels 72 to an outlet 80 of the PM filter 70.

Figure 3:
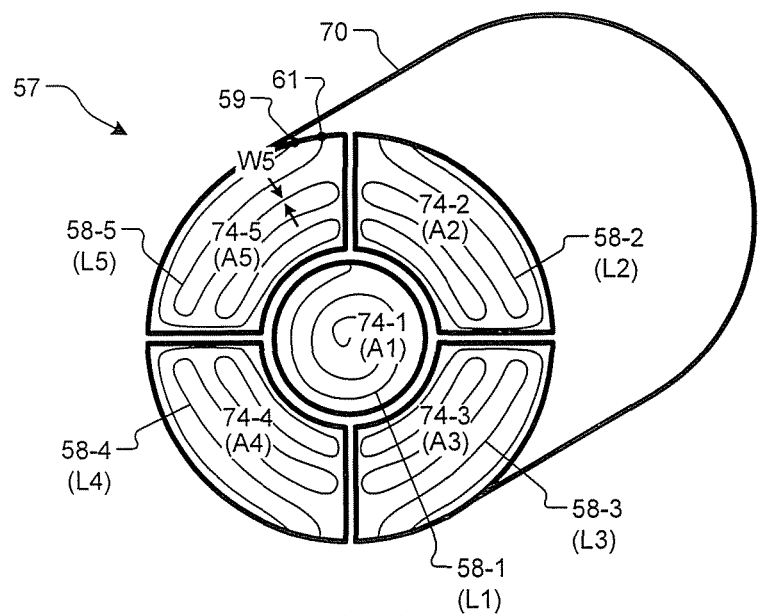
FIG. 3 is a perspective view of an exemplary electric heater including a plurality of heated heater elements with different depths according to the principles of the present disclosure.

Referring to FIG. 3, the electric heater 57 may comprise one or more heater elements 58-1, 58-2, 58-3, 58-4, and 58-5 (collectively, heater elements 58). The heater elements 58 correspond to a plurality of zones 74-1, 74-2, 74-3, 74-4, and 74-5 (collectively, zones 74) of the PM filter 70 and provide heat to initiate regeneration in each of the zones 74. Although five heater elements 58 and five zones 74 are depicted, the number of heater elements and zones may be an integer greater than one.

Each of the heater elements 58 includes a contact area that is exposed to exhaust gas input to each corresponding zone 74. The contact area may include a first area in a plane transverse to the exhaust flow direction. The first area may depend on a length (L) and width (W) of the heater elements 58 in the plane transverse to the exhaust flow direction. For example only, the length of heater element 58-5 (L5) may be measured along the heater element 58-5 from a first endpoint 59 to a second endpoint 61. The width of heater element 58-5 (W5) may be measured transverse to the length (L5). Therefore, the contact areas of the heater elements 58 may be increased or decreased by adjusting the length (L) and/or width (W) of the heater elements 58.

Figure 7:
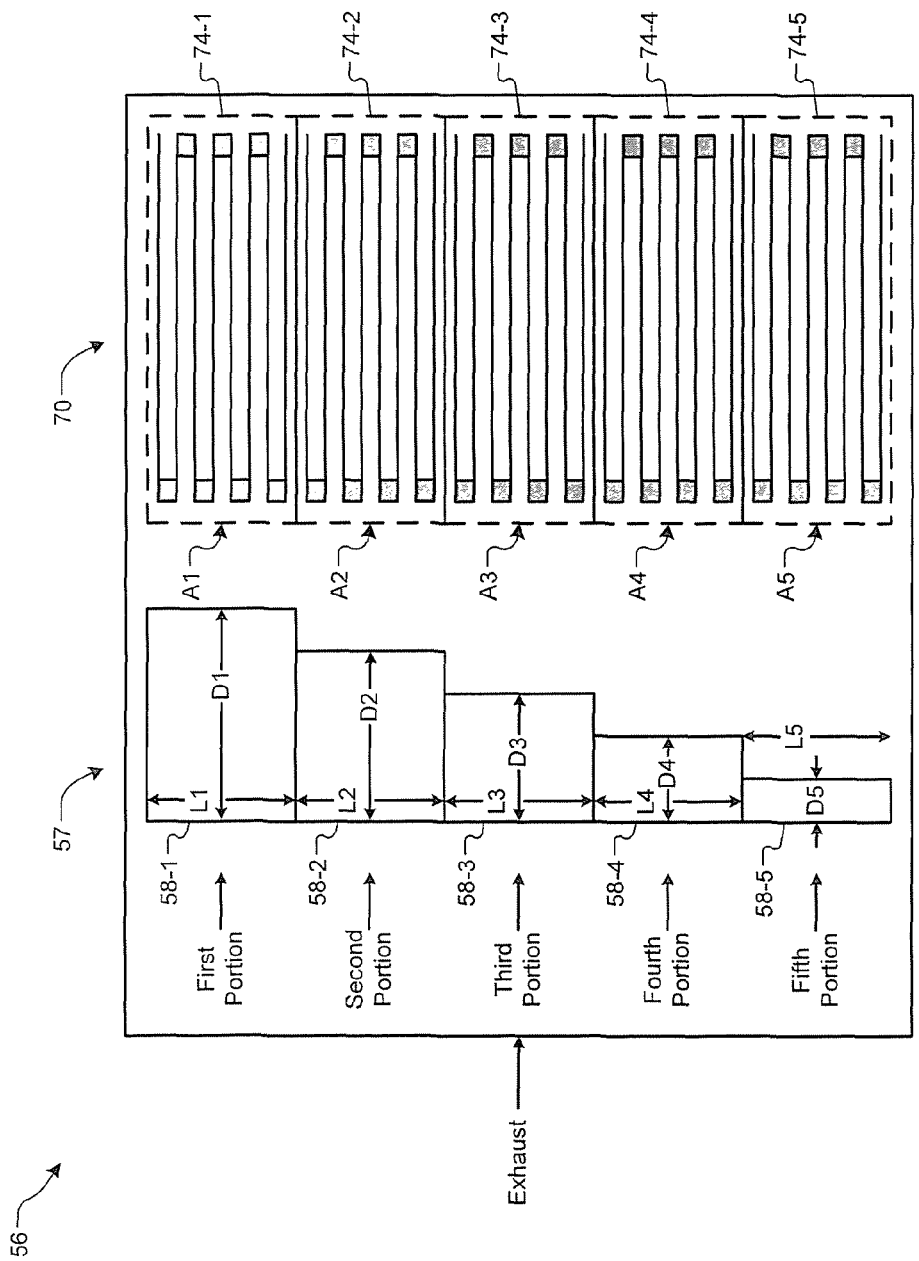
FIG. 7 is a functional block diagram of the exemplary electric heater of FIG. 3.

Referring to FIG. 7, a functional block diagram of the PM filter assembly 56 is shown. The contact area of each of the heater elements 58 also includes a second area in a plane parallel to the exhaust flow direction. The second area may depend on the length (L) and a depth (D) of each of the heater elements 58 in the plane parallel to the exhaust flow direction. For example only, the depth of heater element 58-5 (D5) may be measured in the plane parallel to the exhaust flow direction, starting from the plane that includes the first area (i.e., length L5 and width W5). Therefore, the contact areas of the heater elements 58 may be increased or decreased by adjusting the depth (D) of the heater elements 58.

The heater elements 58 may include other dimensions corresponding to the contact area depending on the geometry of the heater elements 58. For example only, a coil heater may include a wire heater element (not shown). The wire heater element may be a cylindrical wire that includes a circumference (C) as well as length (L). The contact area may depend on the circumference (C) and the length (L) of the wire. Therefore, the contact areas of the wire heater elements may be increased or decreased by adjusting the circumference (C) of the heater elements.

Figure 4:
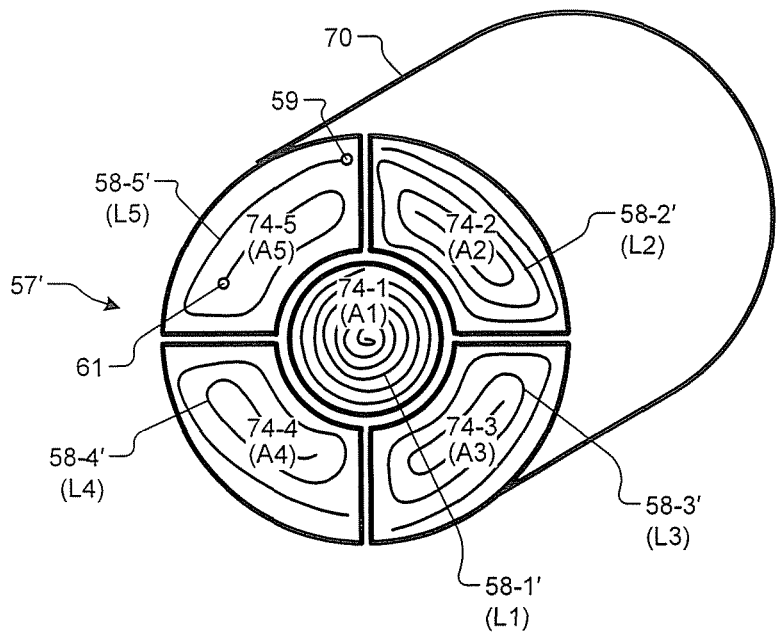
FIG. 4 is a perspective view of another exemplary electric heater including a plurality of heated heater elements with different lengths according to the principles of the present disclosure.
Figure 5:
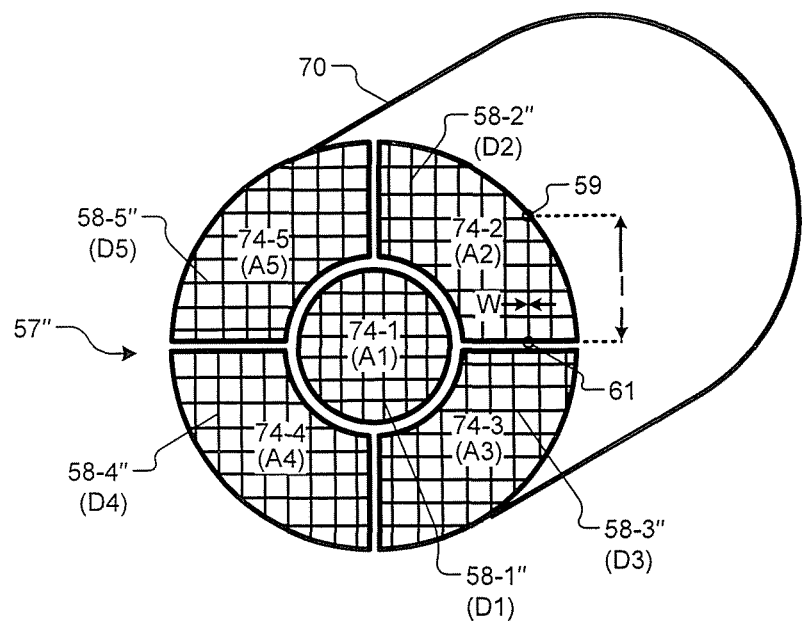
FIG. 5 is a perspective view of another exemplary electric heater including a plurality of heated heater elements that include heater grids according to the principles of the present disclosure.
Figure 6:
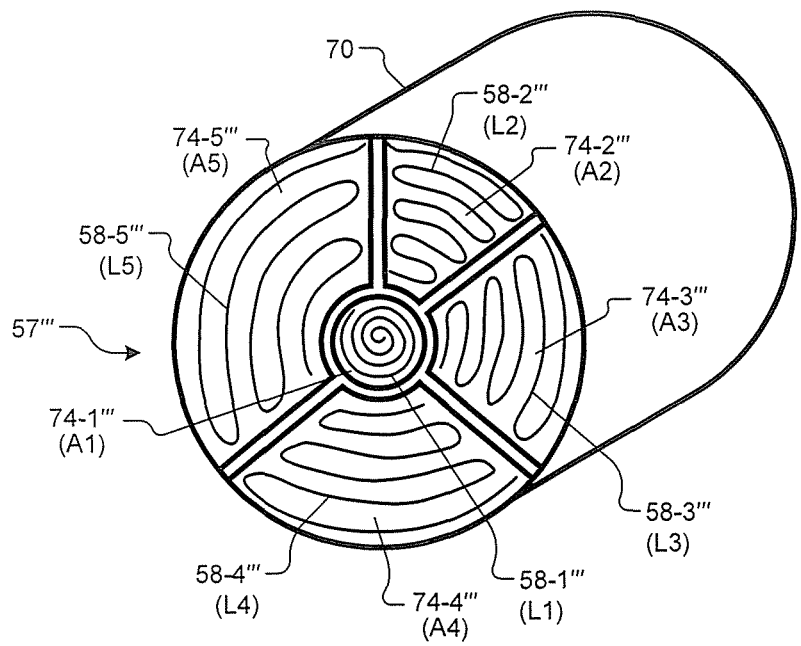
FIG. 6 is a perspective view of another exemplary electric heater including a plurality of heated heater elements corresponding to zones of a PM filter with different inlet areas according to the principles of the present disclosure.

Referring to FIGS. 3-7, each of the zones 74 includes an inlet area (A) that is a portion of the inlet 76 in contact with and/or downstream from a corresponding one of the heater elements 58. For example only, zone 74-5 includes an inlet area (A5) in a plane transverse to the exhaust flow direction. Each inlet area (A) receives exhaust gas that may be heated by a corresponding one of the heater elements 58. In FIGS. 3-5, the inlet areas (A) of each of the zones 74 may include the same amount of area. In FIG. 6, the inlet areas A of each of the zones 74''' include different amounts of area.

A heater density of each of the heater elements 58 may be defined as a ratio of the contact area of one of the heater elements 58 per the inlet area of the corresponding one of the zones 74. A heater density of heater element 58-5 may be defined as a ratio of the contact area of heater element 58-5 to the inlet area (A5) of zone 74-5. The heater density may be adjusted by altering the contact area (i.e., L5, W5, and/or D5) of the heater element 58-5 and/or altering the inlet area (A5) of the corresponding zone 74-5. For example only, the heater density may be increased by increasing one or more of the dimensions (L5, W5, and D5) of the heater element 58-5 and/or decreasing the inlet area (A5).

In FIGS. 3 and 7, each of the heater elements 58 includes a different heater density based on the depths (D) of the heater elements 58. Other dimensions of the heater elements 58, such as the lengths (L) and widths (W), may be the same. Similarly, the zones 74 may include the same inlet area (A) as each other. Thus, a deeper heater element, such as heater element 58-2, includes more contact area than a shallower heater element, such as heater element 58-5. For example only, heater element 58-2 includes a depth D2 that is greater than depth D5 of heater element 58-5. Therefore, heater element 58-2 includes a heater density that is greater than a heater density of heater element 58-5. In FIGS. 3 and 7, each depth is different such that D1>D2>D3>D4>D5.

Referring now to FIG. 4, another electric heater 57' includes a plurality of heater elements 58'. Each of the heater elements 58' includes a different heater density based on the lengths (L) of the heater elements 58' measured from endpoints of each heater element (such as endpoints 59 and 61 of heater element 58-5'.) Other dimensions of the heater elements 58', such as the widths (W) and depths (D), may be the same. Similarly, the zones 74 may include the same inlet areas (A) as each other. Thus, a longer heater element, such as heater element 58-2', includes more contact area than a shorter heater element, such as heater element 58-5'. For example only, heater element 58-2' includes length L2 that is greater than length L5 of heater element 58-5'. Therefore, heater element 58-2' includes a heater density that is greater than a heater density of heater element 58-5'. In FIG. 4, each length is different, such that L1>L2>L3>L4>L5.

Referring now to FIG. 5, another electric heater 57'' includes a plurality of heater elements 58'' that include grids. The grids may be composed of multiple perpendicular segments. Each of the heater elements 58'' includes a different heater density based on the depths (D) of the heater elements 58'', similar to the heater elements 58 of FIGS. 3 and 7. Other dimensions of the heater elements 58'', such as the widths (W) and the lengths (L), may be the same. For example only, the lengths (L) may include multiple partial lengths (l) of the perpendicular segments of each of the heater elements 58''. For example only, each partial length (l) may be measured along the segment from an endpoint 59 to an endpoint 61. The widths (W) may be measured transverse to the lengths (l).

Continuing with FIG. 5, the zones 74 may include the same inlet area (A) as each other. Thus, a deeper heater element, such as heater element 58-2'', includes more contact area than a shallower heater element, such as heater element 58-5''. For example only, heater element 58-2'' includes depth D2 that is greater than depth D5 of heater element 58-5''. Therefore, heater element 58-2'' includes a heater density that is greater than a heater density of heater element 58-5''. In FIG. 5, each depth is different such that D1>D2>D3>D4>D5.

Referring now to FIG. 6, each of the heater elements 58''' includes a different heater density based on the inlet area (A) of each of the corresponding zones 74'''. Each of the heater elements 58''' may include the same amounts of contact area. Alternatively, each of the heater elements 58''' may include different amounts of contact area. A smaller zone, such as zone 74-1''', includes less inlet area than a larger zone, such as zone 74-5'''. For example only, zone 74-1''' includes inlet area A1 that is less than inlet area A5 of zone 74-5'''. In FIG. 6, each area is different such that A1<A2<A3<A4<A5. When heater element 58-1''' and heater element 58-5''' have the same contact area, then heater element 58-1''' includes a greater heater density than heater element 58-5'''.

Referring now to FIG. 7, a functional block diagram of the PM filter assembly 56 in FIG. 3 is shown. Exhaust gas enters the PM filter assembly 56 and contacts heater elements 58 of the electric heater 57. Portions of the exhaust gas contact each of the heater elements 58 of the electric heater 57. Each of the heater elements 58 includes a different contact area that is exposed to each portion of the exhaust gas. The contact areas of the heater elements 58 differ by the depth (D) of each of the heater elements 58 extending in the direction parallel to the exhaust gas flow.

For example only, a first heater element, such as heater element 58-1, may include a first depth (D1) that corresponds to a first contact area; a second heater element, such as heater element 58-2, may include a second depth (D2) that is less than D1 and that corresponds to a second contact area; a third heater element, such as heater element 58-3, may include a third depth (D3) that is less than D2 and that corresponds to a third contact area; a fourth heater element, such as heater element 58-4, may include a fourth depth (D4) that is less than D3 and that corresponds to a fourth contact area; and a fifth heater element, such as heater element 58-5, may include a fifth depth (D5) that is less than D4 and that corresponds to a fifth contact area. Thus, each depth D1, D2, D3, D4, and D5 of the heater elements 58 corresponds to a different contact area for each of the corresponding heater elements 58.

Each of the heater elements 58 corresponds to one of the zones 74. A first portion of exhaust gas contacts heater element 58-1. Heater element 58-1 may be activated to generate heat that is transferred to the first portion of the exhaust gas before the first portion enters zone 74-1. Each of the other ones of the elements 58 may heat other portions of the exhaust gas entering corresponding zones. Each of the zones 74 includes an inlet area that receives a portion of exhaust gas heated by a corresponding one of the heater elements 58. Zone 74-1 may include inlet area A1 that receives heated exhaust gas from heater element 58-1. In FIGS. 3-5, A1 may be less than the other inlet areas A2, A3, A4, and A5. The other ones of the zones 74 may include the same area, i.e. A2=A3=A4=A5. Alternatively, each of the zones 74 may include the same amount of inlet area, i.e. A1=A2=A3=A4=A5.

Accordingly, ratios of the contact areas of each of the heater elements 58 to the areas of the corresponding zones 74 (i.e., the heater densities of the heater elements 58) may be different. For example only, a ratio of the contact area of heater element 58-1 to the area of zone 74-1 is greater than a ratio of the contact area of heater element 58-2 to the area of zone 74-2. The ratio of the contact area of heater element 58-2 to the area of zone 74-2 is greater than a ratio of the contact area of heater element 58-3 to the area of zone 74-3. The ratio of the contact area of heater element 58-3 to the area of zone 74-3 is greater than a ratio of the contact area of heater element 58-4 to the area of zone 74-4. The ratio of the contact area of heater element 58-4 to the area of zone 74-4 is greater than a ratio of the contact area of heater element 58-5 to the area of zone 74-5.

Heater elements that include greater heater densities may contact more exhaust gas as the exhaust gas flows into the corresponding zones. By contacting more exhaust gas, more heat may be transferred to heat the exhaust gas to the regeneration temperature. Heater elements that include greater heater densities may also contact the exhaust gas for longer periods. By contacting the exhaust gas for longer periods, more heat may be transferred to heat the exhaust gas to the regeneration temperature. Exhaust flow rates through zones with decreased inlet areas (i.e., greater heater densities) may be decreased.

After a first one of the zones 74 is regenerated, the flow rate through the regenerated zone may increase. The regenerated zone has less PM in the channels 72 to impede the flow of the exhaust gas through the regenerated zone than the non-regenerated zones. The total flow rate through all of the zones 74 remains the same. Flow rates through each of the other non-regenerated zones may decrease. Therefore, other heater elements corresponding to the non-regenerated zones may include lower heater densities than a heater element corresponding to the first regenerated zone.

Figure 8:
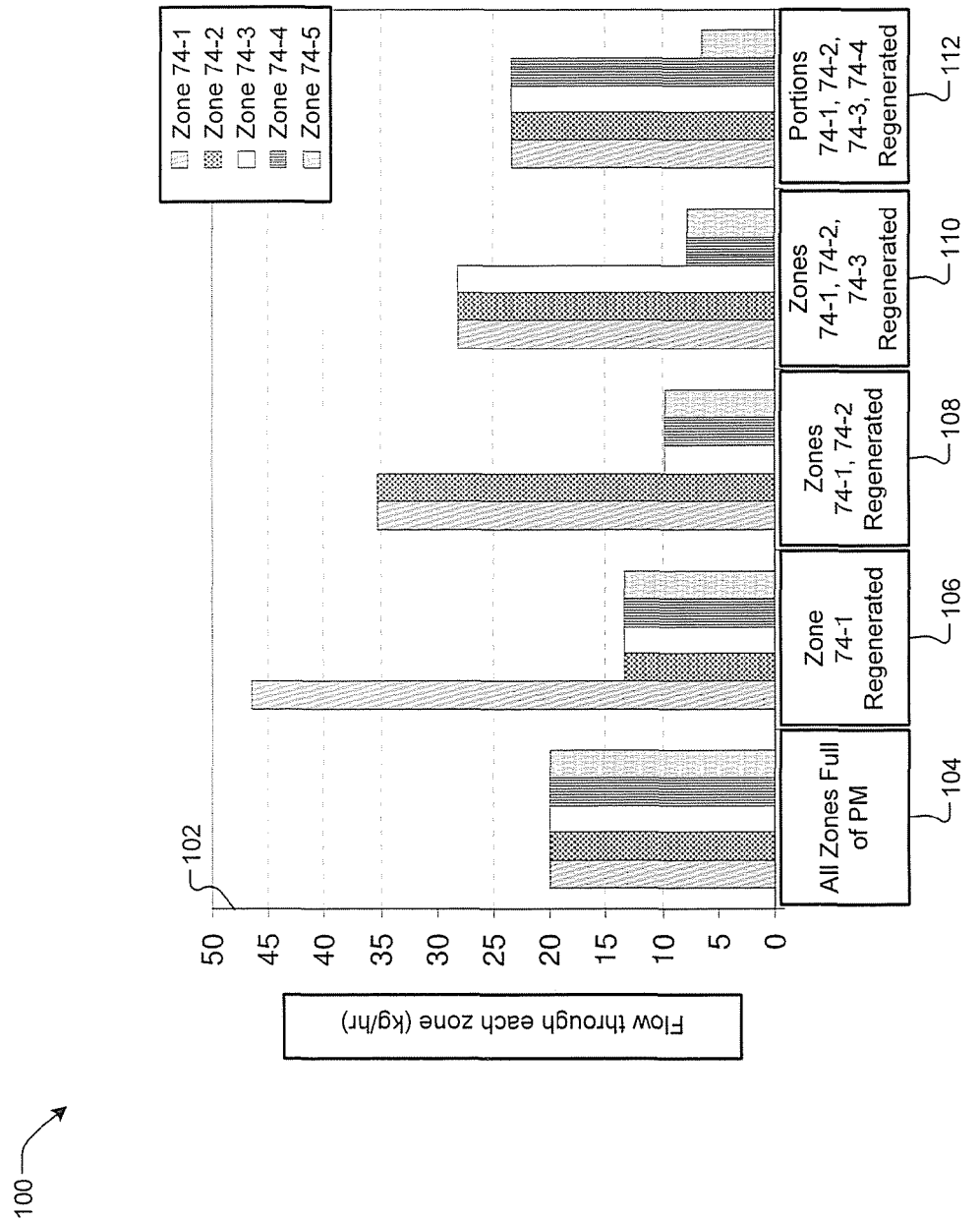
FIG. 8 is a chart depicting exhaust flow rates through zones of an exemplary electrically heated particulate filter of the present disclosure.

Referring now to FIG. 8, a chart 100 illustrates exemplary exhaust flow rates through each of the zones 74 as successive ones of the zones 74 are regenerated. A y-axis 102 corresponds to the exhaust flow rate (kg/hr) through each of the zones 74. A first set of columns 104 illustrates exhaust flow rates through the zones 74 when all of the zones 74 of the PM filter 70 are full of PM. The exhaust flow rate through each of the zones 74 is approximately the same at 20 kg/hr. A total exhaust flow rate through the zones 74 may remain constant at 100 kg/hr during regeneration.

The ECM 32 activates the heater elements 58 in a particular order based on the heater density of each of the heater elements 58 to regenerate the PM filter 70. The ECM 32 may activate a first heater element, such as heater element 58-1 to regenerate the first zone 74-1. The first heater element 58-1 includes a sufficient heater density to heat the exhaust gas input to the first zone 74-1 to the regeneration temperature when the exhaust flow rate is greater than 20 kg/hr. The heater density of the first heater element 58-1 may be optimized to heat the exhaust gas to the regeneration temperature at various exhaust flow rates.

A second set of columns 106 illustrates exhaust flow rates through the zones 74 after the first zone 74-1 has been regenerated. Once the first zone 74-1 regenerates, the exhaust flow rate through the first zone 74-1 increases to approximately 47 kg/hr. The exhaust flow rate through each of the remaining non-regenerated zones 74-2, 74-3, 74-4, and 74-5 decreases to approximately 13 kg/hr.

The ECM 32 may activate a second heater element, such as heater element 58-2, after the first zone 74-1 regenerates. The second heater element 58-2 may include a lower heater density than the first heater element 58-1 because the exhaust flow rate through the corresponding zone 74-2 has decreased. The second heater element 58-2 may include a sufficient heater density to heat the exhaust gas input to the second zone 74-2 to the regeneration temperature when the exhaust flow rate is 13 kg/hr.

A third set of columns 108 illustrates exhaust flow rates through the zones 74 after the first and second zones 74-1 and 74-2 have been regenerated. The exhaust flow rate through the regenerated zones 74-1 and 74-2 increases to approximately 70 kg/hr (35 kg/hr per zone). Thus, the exhaust flow rate through each of the remaining non-regenerated zones 74-3, 74-4, and 74-5 decreases to approximately 10 kg/hr.

The ECM 32 may activate a third heater element, such as heater element 58-3, after the second zone 74-2 regenerates. The third heater element 58-3 may include a lower heater density than the second heater element 58-2 because the exhaust flow rate through the corresponding zone 74-3 has decreased. The third heater element 58-3 may include a sufficient heater density to heat the exhaust gas input to the third zone 74-3 to the regeneration temperature when the exhaust flow rate is 10 kg/hr.

A fourth set of columns 110 illustrates exhaust flow rates through the zones 74 when zones 74-1, 74-2, and 74-3 have been regenerated. A fifth set of columns illustrates exhaust flow rates through the zones 74 when zones 74-1, 74-2, 74-3, and 74-4 have been regenerated. Each one of the remaining heater elements 58-4 and 58-5 that correspond to the non-regenerated zones 74-4 and 74-5 may continue to decrease in heater density in order of activation by the ECM 32.

Figure 9:
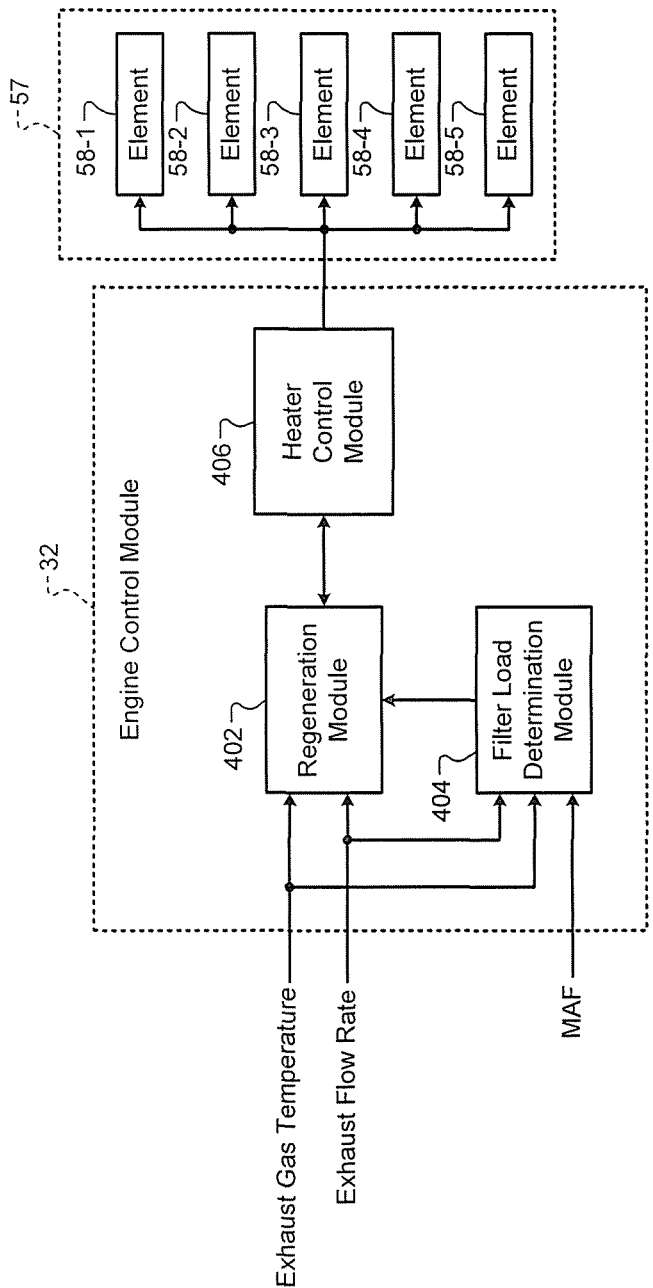
FIG. 9 is a functional block diagram of an exemplary engine control module according to the principles of the present disclosure.

Referring now to FIG. 9, a functional block diagram of an exemplary ECM 32 is presented. The ECM 32 may include a regeneration module 402 that determines when the filter load is greater than the filter load threshold. A filter load determination module 404 may determine the filter load based on the MAF, exhaust temperatures, and/or exhaust gas flow rate. When the filter load is greater than the filter load threshold, the regeneration module 402 may begin regeneration of the PM filter 70.

The regeneration module 402 may activate a heater control module 406 to begin regeneration. For example only, the heater elements 58 may be activated by applying a predetermined level of power to the heater elements 58. The heater control module 406 activates the heater element with the greatest heater density first. For example only, the heater control module 406 activates the first heater element 58-1 to regenerate the first zone 74-1 of the PM filter 70. After the first zone 74-1 regenerates, the heater control module 406 activates the second heater element 58-2 to regenerate the second zone 74-2 of the PM filter 70. The heater control module 406 activates each of the heater elements 58 in a particular order from the greatest heater density to the lowest heater density. Each of the heater elements 58 may be activated until PM in the corresponding one of the zones 74 begins to combust. The heater elements 58 may be deactivated once the PM begins to combust.

Figure 10:
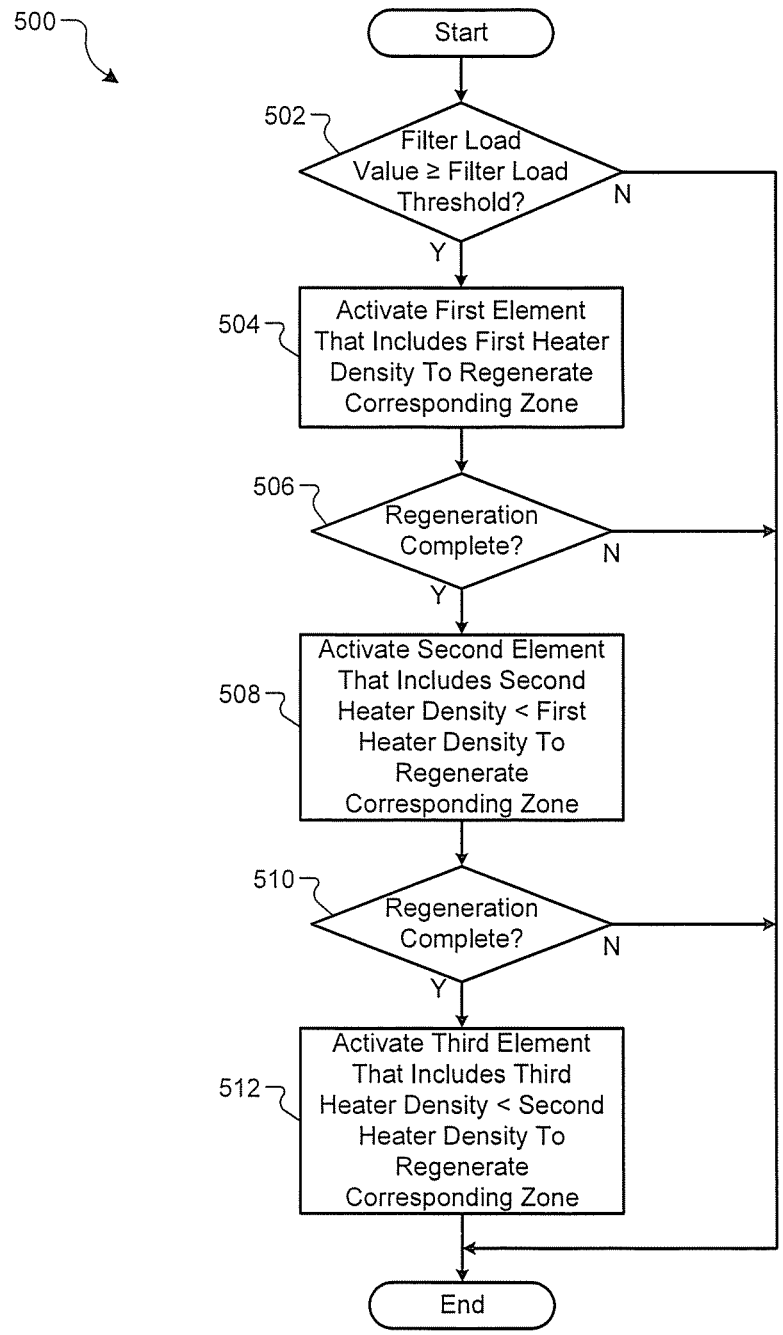
FIG. 10 is a flowchart depicting exemplary steps performed in the engine control module.

Referring now to FIG. 10, a flowchart 500 depicts an exemplary method performed by the ECM 32. Control begins in step 502 when control determines whether the filter load value is greater than or equal to the filter load threshold. When the filter load value is greater than the filter load threshold, control begins regeneration of the PM filter 70. In step 504, control activates a first heater element of the electric heater 57, such as heater element 58-1 that includes a first heater density. Control may activate the first heater element until PM begins to combust in a corresponding first zone, such as zone 74-1. PM in the first zone continues to combust through the first zone.

In step 506, control determines whether regeneration of the first zone completed. When regeneration of the first zone completes, control continues to step 508. Otherwise control may end. In step 508, control activates a second heater element of the electric heater 57, such as heater element 58-2 that includes a second heater density. The second heater density is less than the first heater density. Control may activate the second heater element until PM begins to combust in a corresponding second zone, such as zone 74-2. PM in the second zone continues to combust through the second zone.

In step 510, control determines whether regeneration of the second zone completed. When regeneration of the second zone completes, control continues to step 512. Otherwise control may end. In step 512, control activates a third heater element of the electric heater 57, such as heater element 58-3 that includes a third heater density. The third heater density is less than the second heater density. Control may activate the third heater element until PM begins to combust in a corresponding third zone, such as zone 74-3. PM in the third zone continues to combust through the third zone.

Although three of the zones 74 are regenerated in the above method, additional ones of the heater elements 58 may be subsequently activated to regenerate additional corresponding ones of the zones 74. Each one of the heater elements 58 is activated by the ECM 32 in order from the heater element that includes the greatest heater density to the heater element that includes the lowest heater density.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An exhaust treatment system comprising:
   a particulate matter (PM) filter that filters PM from exhaust gas and that includes N zones that are independent from one another, wherein each of the N zones includes an inlet area that receives a portion of the exhaust gas and wherein N is an integer greater than one;
   a first heater element that includes a contact area that heats exhaust gas input to an inlet area of a first one of the N zones, wherein the first one of the N zones is axially aligned with a center axis of the PM filter;
   a second heater element that includes a second contact area that heats exhaust gas input to an inlet area of a second one of the N zones, wherein the second one of the N zones is one of a plurality of zones surrounding the first one of the N zones in a circular arrangement,
   wherein a first ratio of the contact area of the first heater element to the inlet area of the first zone is greater than a second ratio of the contact area of the second heater element to the inlet area of the second zone; and
   a heater control module that selectively activates the first heater element and the second heater element in an order based on the first ratio and the second ratio.

2. The exhaust treatment system of claim 1, further comprising:
   a third heater element that includes a contact area that heats exhaust gas input to an inlet area of a third one of the N zones,
   wherein the second ratio of the contact area of the second heater element to the inlet area of the second zone is greater than a third ratio of the contact area of the third heater element to the inlet area of the third zone.

3. The exhaust treatment system of claim 1, wherein the contact area of the first heater element is greater than the contact area of the second heater element.

4. The exhaust treatment system of claim 1, wherein the inlet area of the second zone is greater than the inlet area of the first zone.

5. The exhaust treatment system of claim 1, wherein each of the first and second heater elements is one of a coil heater, a grid heater, a foil heater, and a thick-film heater.

6. The exhaust treatment system of claim 1, wherein the contact area of the first heater element includes a first depth extending in a direction that is parallel to a flow direction of the exhaust gas and the contact area of the second heater element includes a second depth extending in a direction that is parallel to the flow direction of the exhaust gas, wherein the first depth is greater than the second depth.

7. The exhaust treatment system of claim 1, wherein the contact area of the first heater element includes a first length and the contact area of the second heater element includes a second length, wherein the first length is greater than the second length.

8. The exhaust treatment system of claim 1, wherein
   the heater control module activates the first heater element until PM in the first one of the N zones combusts and activates the second heater element until PM in the second one of the N zones combusts.

9. The exhaust treatment system of claim 8, wherein the heater control module activates the second heater element after regeneration of the first one of the N zones completes.

10. The exhaust treatment system of claim 8, wherein the heater control module activates each of the first and second heater elements by applying a predetermined level of power.

11. A method of operating an exhaust treatment system, comprising:
    providing a particulate matter (PM) filter that filters PM from exhaust gas and that includes N zones that are independent from one another, wherein each of the N zones includes an inlet area that receives a portion of the exhaust gas and wherein N is an integer greater than one;
    activating a first heater element that includes a contact area that heats exhaust gas input to an inlet area of a first one of the N zones until PM in the first zone combusts, wherein the first one of the N zones is axially aligned with a center axis of the PM filter;
    activating a second heater element that includes a second contact area that heats exhaust gas input to an inlet area of a second one of the N zones until PM in the second zone combusts, wherein the second one of the N zones is one of a plurality of zones surrounding the first one of the N zones in a circular arrangement,
    wherein a first ratio of the contact area of the first heater element to the inlet area of the first zone is greater than a second ratio of the contact area of the second heater element to the inlet area of the second zone; and
    selectively activating the first heater element and the second heater element in an order based on the first ratio and the second ratio.

12. The method claim 11, further comprising:
activating a third heater element that includes a contact area that heats exhaust gas input to an inlet area of a third one of the N zones until PM in the third zone combusts, wherein the second ratio of the contact area of the second heater element to the inlet area of the second zone is greater than a third ratio of the contact area of the third heater element to the inlet area of the third zone.

13. The method claim 11, wherein the contact area of the first heater element is greater than the contact area of the second heater element.

14. The method claim 11, wherein the inlet area of the second zone is greater than the inlet area of the first zone.

15. The method claim 11, wherein each of the first and second heater elements is one of a coil heater, a grid heater, a foil heater, and a thick-film heater.

16. The method claim 11, wherein the contact area of the first heater element includes a first depth extending in a direction that is parallel to a flow direction of the exhaust gas and the contact area of the second heater element includes a second depth extending in a direction that is parallel to the flow direction of the exhaust gas, wherein the first depth is greater than the second depth.

17. The method claim 11, wherein the contact area of the first heater element includes a first length and the contact area of the second heater element includes a second length, wherein the first length is greater than the second length.

18. The method claim 11, further comprising activating the second heater element after regeneration of the first zone completes.

19. The method claim 11, further comprising activating each of the first and second heater elements by applying a predetermined level of power.

20. The method of claim 11, further comprising activating a plurality of heater elements that correspond to the N zones, wherein each heater element includes a ratio of a contact area of the heater element to an inlet area of a corresponding one of the N zones, wherein the heater elements are activated one at a time in order from a heater element having the greatest ratio to a heater element having the smallest ratio.

* * * * *

UNITED STATES PATENT AND TRADEMARK OFFICE
CERTIFICATE OF CORRECTION

| | | |
|---|---|---|
| PATENT NO. | : 8,475,574 B2 | Page 1 of 1 |
| APPLICATION NO. | : 12/536089 | |
| DATED | : July 2, 2013 | |
| INVENTOR(S) | : Gonze et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 372 days.

Signed and Sealed this
Thirtieth Day of December, 2014

Michelle K. Lee
*Deputy Director of the United States Patent and Trademark Office*